United States Patent
Lien

(10) Patent No.: US 11,807,915 B2
(45) Date of Patent: Nov. 7, 2023

(54) CONCENTRATION OF PRECIOUS METALS AND RARE EARTH ELEMENTS

(71) Applicant: Larry Lien, Solana Beach, CA (US)

(72) Inventor: Larry Lien, Solana Beach, CA (US)

(*) Notice: Subject to any disclaimer, the term of this patent is extended or adjusted under 35 U.S.C. 154(b) by 43 days.

(21) Appl. No.: 17/348,909

(22) Filed: Jun. 16, 2021

(65) Prior Publication Data
US 2021/0388464 A1   Dec. 16, 2021

Related U.S. Application Data

(60) Provisional application No. 63/039,682, filed on Jun. 16, 2020.

(51) Int. Cl.
| | | |
|---|---|---|
| *C22B 9/02* | (2006.01) | |
| *C22B 59/00* | (2006.01) | |
| *C22B 11/00* | (2006.01) | |

(52) U.S. Cl.
CPC .............. *C22B 9/023* (2013.01); *C22B 11/00* (2013.01); *C22B 59/00* (2013.01)

(58) Field of Classification Search
CPC ......... C22B 9/023; C22B 11/00; C22B 59/00; C22B 3/24; C22B 3/22; C22B 11/04; Y02P 10/20
USPC .......................................................... 75/413
See application file for complete search history.

(56) References Cited

U.S. PATENT DOCUMENTS

| | | | |
|---|---|---|---|
| 4,176,057 A * | 11/1979 | Wheatley | ............... B01D 65/08 210/639 |
| 9,770,743 B2 | 9/2017 | Mork et al. | |
| 10,450,633 B2 | 10/2019 | Lien | |
| 2019/0024212 A1* | 1/2019 | Lien | ............... C22B 3/22 |
| 2019/0135672 A1* | 5/2019 | Riffe | ............... C02F 9/00 |

FOREIGN PATENT DOCUMENTS

| | | |
|---|---|---|
| CN | 109136561 A | 1/2019 |
| RU | 2086683 C1 | 8/1997 |
| RU | 2404140 C2 | 11/2010 |
| RU | 120968 U1 | 10/2012 |
| SU | 4362 A1 | 1/1928 |

OTHER PUBLICATIONS

Andrade, L.H., et al., "Nanofiltration and Reverse Osmosis Applied to Gold Mining Effluent Treatment and Reuse", Environmental Engineering, Braz. J. Chem. Eng. vol. 34, No. 1, Jan.-Mar. 2017, pp. 93-107 https://doi.org/10.1590/0104-6632.20170341s20150082.
Written Opinion and International Search Report, PCT/US2021/037544, dated Sep. 16, 2021, 10 pages.

* cited by examiner

*Primary Examiner* — Brian D Walck
*Assistant Examiner* — Danielle Carda
(74) *Attorney, Agent, or Firm* — Honigman LLP

(57) ABSTRACT

Methods of recovering precious metals from unconventional feed water sources. In approaches, the methods use a combination of one or more of ultrafiltration, nanofiltration, and/or reverse osmosis membranes. The unconventional feed water source may be salt lake brines, coal-fired plant flue-gas scrubber blowdown water, high salinity brines, concentrated brine from desalination of seawater and the like sources. The recovered precious metals may include gold tetrachloride, gold sulfate, silver tetrachloride, silver sulfate, rare earth elements, or mixtures thereof.

7 Claims, 3 Drawing Sheets

Flow Sheet for Gold/Silver/REE Recovery from Unconventional Feed Water Sources (Flue Gas Scrubbers)

Post Carbon Flow Sheet for Gold/Silver/REE Recovery from Unconventional Feed Water Sources (High Salinity)

US 11,807,915 B2

CONCENTRATION OF PRECIOUS METALS AND RARE EARTH ELEMENTS

CROSS REFERENCE TO RELATED APPLICATIONS

This application claims the benefit of U.S. Provisional Application No. 63/039,682 filed Jun. 16, 2020, which is incorporated herein by reference in its entirety.

FIELD

The present disclosure relates to concentration of precious metal, such as gold tetrachloride, gold sulfate, silver tetrachloride, silver sulfate and rare earth elements (REE), and more particularly, concentration of such compounds with ultrafiltration, nanofiltration, modified reverse osmosis membranes and/or adsorption from unconventional feed water sources.

BACKGROUND

Gold recovery is often performed using the so-called cyanidation or cyanide process or, alternatively, a thiosulphate leaching process. In these common processes, the gold is complexed with cyanide or thiosulphate permitting separation and recovery. However, when gold or other precious metals are already bound or complexed with an anion or other compound, such as gold or metal salts, the traditional processes are less effective in recovery. Gold tetrachloride or gold sulfate, for instance, tends to have little or no affinity for the traditional cyanide or thiosulphate leaching mechanisms.

SUMMARY

In one approach or embodiment herein, a method of recovering precious metals from unconventional feed water sources is provided. In one aspect, the method includes starting with or providing a feed water source including precious metals; concentrating the precious metals from the feed water source using one or more of ultrafiltration, nanofiltration, and/or reverse osmosis membranes; and recovering the precious metals from the concentrate.

In other embodiments, the methods of the previous paragraph may be combined with one or more optional method steps including: wherein the feed water source includes a salt lake brine, a coal-fired plant flue-gas scrubber blowdown water, a concentrated brine from desalination of seawater, a high salinity brine source, and/or combinations thereof; and/or wherein the precious metals are in the form of gold tetrachloride, gold sulfate, silver tetrachloride, silver sulfate, rare earth elements, or mixtures thereof; and/or wherein the feed water source including the precious metals is initially contacted with a colloidal carbon for a time effective to adsorb the precious metals; and/or wherein the colloidal carbon has an average particle size ranging from 0.1 to about 10 microns; and/or wherein the about 5 to about 25 weight percent colloidal carbon is mixed the feed water source; and/or wherein the colloidal carbon is mixed with the feed water source including the precious metals for about 5 to about 60 minutes; and/or wherein the concentrating includes an ultrafiltration membrane to concentrate the colloidal carbon adsorbed with the precious metals and optionally recirculating a portion of the concentrate back to the feed water source; and/or wherein filtrate from the ultrafiltration membrane is processed through nanofiltration membranes to concentrate any precious metals therein; and/or wherein a portion of the ultrafiltration concentrate is processed through a filter to dewater the colloidal carbon adsorbed with the precious metals; and/or wherein the precious metals are in the form of gold tetrachloride, gold sulfate, silver tetrachloride, silver sulfate, or mixtures thereof; and/or wherein the concentrating includes an ultrafiltration membrane and one or two nanofiltration membranes to concentrate the precious metals; and/or wherein the precious metals are recovered as concentrate from the nanofiltration membrane or the concentrate from serial nanofiltration membranes.

In yet other approaches or embodiment, which may be combined with any other embodiment, the precious metals may be recovered from the colloidal carbon and filtrate from the ultrafiltration membrane may be processed through one or more nanofiltration membranes to concentrate any remaining precious metals therein; and/or wherein a portion of the ultrafiltration concentrate is processed through a filter to dewater the colloidal carbon adsorbed with the precious metals; and/or wherein the precious metals are in the form of gold tetrachloride, gold sulfate, silver tetrachloride, silver sulfate, or mixtures thereof; and/or wherein the concentrating includes an ultrafiltration membrane to generate a concentrate and a permeate including the target precious metals and wherein the permeate is processed through one or two nanofiltration membranes to recover the precious metals; and/or wherein the target precious metals are recovered as concentrate from the one or two nanofiltration membranes.

DETAILED DESCRIPTION

Figure 1:
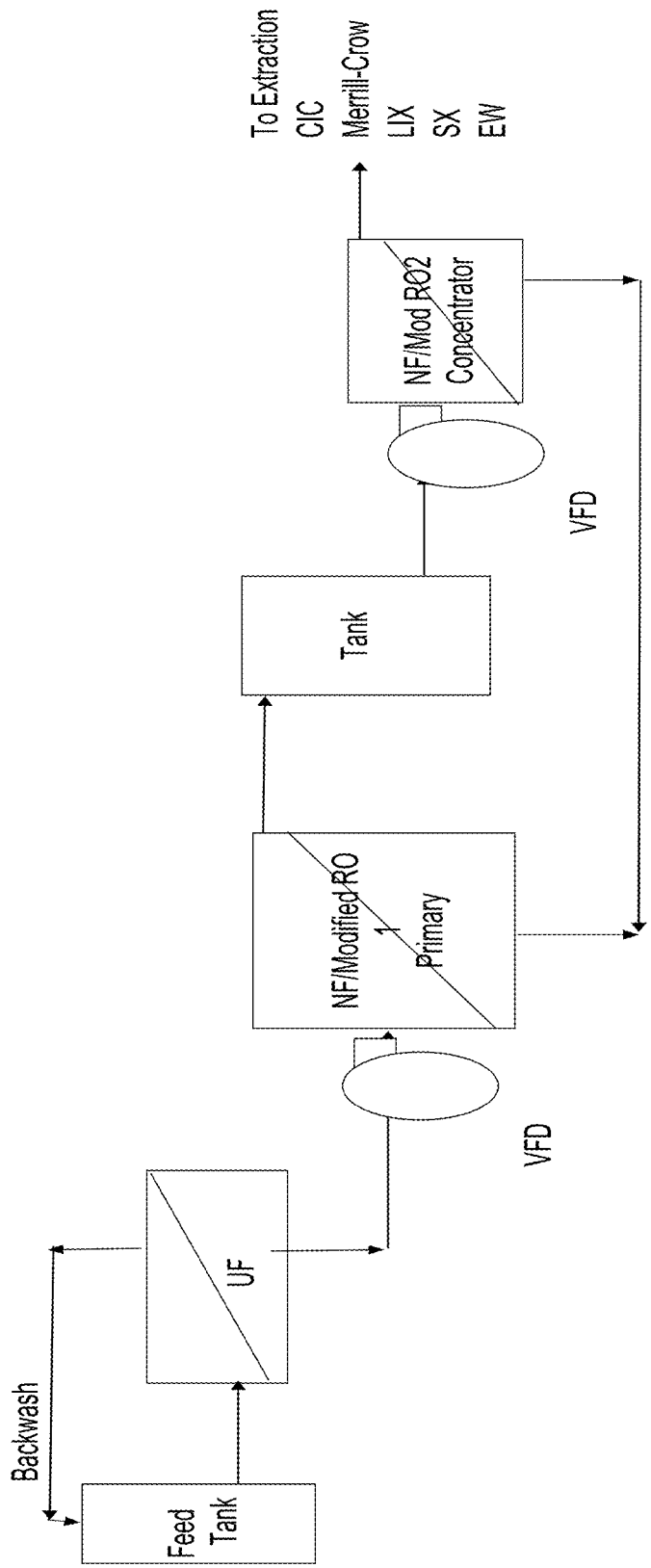
FIG. 1 is a flow diagram of an exemplary recovery process for gold, silver, and/or REE from unconventional feed water sources (e.g., flue gas scrubber blowdown water)

A membrane filtration process using, for instance, ultrafiltration, nanofiltration, and/or modified reverse osmosis membranes is described herein to recover and concentrate precious metal salts, in particular, gold tetrachloride and/or gold sulfate from unconventional gold sources. For instance, certain unconventional feed water sources have been discovered to include precious metals or salts thereof in small concentrations. These feed water sources include salt lake brines, coal-fired plant flue gas scrubber blowdown water, concentrated brine from desalination of seawater, high salinity brines, or any other aqueous source where gold or other precious metals may have leached or been produced as a byproduct of a process. Such unconventional feed water sources often include precious metal salts such as gold tetrachloride and/or gold sulfate. In other approaches, the recovery and concentration processes herein may also apply to the recovery of silver tetrachloride, silver sulfate and/or rare earth elements (REE), which have been discovered in recoverable amounts in the various unconventional feed sources listed above. The rare earth elements that may be recovered in the methods herein include, for instance, lanthanides, scandium, yttrium, cerium, and other known rare earth elements described herein.

The amounts of gold, silver and/or REEs (and/or salts thereof) in these unconventional feed water sources are low. However, the unique processes herein utilize membrane technology (including nanofiltration) and/or carbon adsorption in a specific manner to concentrate these low levels of precious metals and/or precious metal salts to recoverable concentrations that was previously not thought possible via membrane processing. Throughout the processes herein or at the end of the process, the target precious metals may be extracted via gravity separation, carbon recovery (CIP, CIL, or CIC), packed carbon, merrill-crowe processing, solvent extraction, liquid-liquid extraction, electro-winning, combinations thereof, or the like or even through use of finely milled colloidal carbon to ultimately recover the target metals. In some approaches, initial extraction/adsorption (before the membrane processing) of the gold or silver salts with colloidal carbon particles less than about 2 microns has been found effective to adsorb the gold or silver, specifically when the target metals are in the form of a gold-chloride or silver-chloride complex, and/or when the target metals are present in high salinity brines. As mentioned above, traditional methods of gold leaching and recovery, such as gold cyanidation or thiosulfate leaching, are unable to effectively recover gold salts (or silver salts) from such unconventional source. Without wishing to be limited by theory, it is believed the prior processes using cyanide or thiosulfate are unable to complex with the gold or other precious metal when the gold or other metal is already bound with or complexed with chloride or sulfate, such as when the gold or other metal is found in the unconventional feed water sources.

In one approach of the recovery methods herein, the processes start with low levels of target precious metals in the form of precious metal salts, for instance gold tetrachloride, from these unconventional sources (in amounts ranging from about 0.01 ppm to about 5 ppm or even to about 10,000 ppm in some instances) and concentrate the gold as far as the chemistry of the process will allow using the optional colloidal carbon and/or the membrane filtration, such as nanofiltration. The concentration factor can be as high as about 5 to about 20 times concentration to insure the most efficient and smallest volumes with the highest metals concentrations possible as feed to the extraction of metals processes following the membrane systems.

For concentration using any embodiment herein, a variety of polymeric type membranes may be used. Examples include nanofiltration membranes such as modified (oxidized) polyamide polymers, carbon nanotube (CNT) backbone membranes, phenolformaldehyde polymers, polysulfonamide and/or cellulose acetate membranes. The membranes may have up to a nominal 300 Molecular weight cut off. Any of the membranes are functional, but modified nanofiltration membranes from oxidized polyamide and CNT membranes have demonstrated efficient membrane flux and separation factors for use with the unconventional feed water sources and unique form of the target precious metals in salt forms (chlorides and sulfates, etc.).

Use of nanofiltration membranes to recover precious metals, such as gold or silver in this manner is unexpected because nanofiltration membranes generally reject divalent anions (such as sulfates or phosphates) at high levels (such as greater than 98%), but typically transmit high levels of monovalent anions like chlorides. As traditional gold sources are not divalent, it is unexpected that nanofiltration membranes would concentrate gold from the unconventional feed water sources. FIG. 1 shows an exemplary method of recovering precious metals as concentrate from nanofiltration membrane(s) (that is the nanofiltration membrane rejects the target metal) after first processing through an optional ultrafiltration membrane. In one embodiment, the precious metals are recovered via a two-stage filtration wherein the concentrate from a first nanofiltration membrane is passed to a second nanofiltration membrane whereby the precious metals are recovered as concentrate therefrom.

Figure 2:
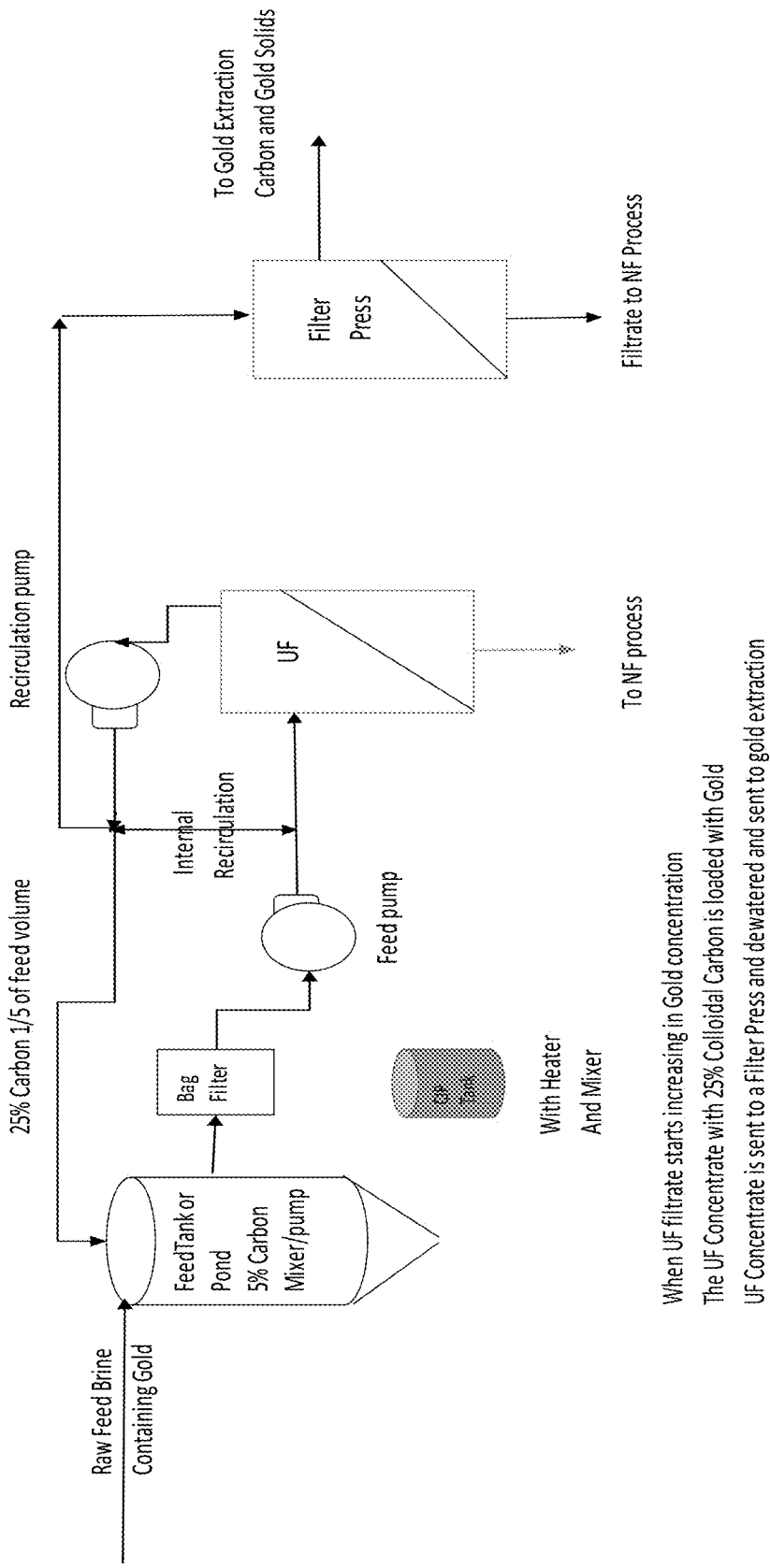
FIG. 2 is a flow diagram of an exemplary recovery process using colloidal carbon adsorption for recovering gold from unconventional feed water sources (e.g., high salinity brines)

In other approaches and, for instance, with high salinity brine feed sources with about 50 to about 200 mg/l chlorides (or in some instances even up to about 200,000 to or 250,000 ppm of salts or chlorides), any of the processes herein may use colloidal carbon or activated colloidal carbon (such as colloidal carbon with an average particle size less than about 10 microns, preferably less than about 2 microns, and most preferably about 1 micron or less) to initially adsorb the gold and/or silver salts from these types of unconventional feed sources (See, e.g., FIG. 2). In some approaches, the activated colloidal carbon may be, for instance, activated carbon as described in U.S. Pat. No. 9,770,743, which is incorporated herein by reference. The activated colloidal carbon may be provided with stabilizers and other additives as further described in U.S. Pat. No. 9,770,743. Surprisingly, conventional activated and packed activated carbon (larger particle size) do not adsorb gold chloride from high salinity brines (that is, traditional carbon may only absorb less than 10% gold). Unexpectedly, colloidal carbon with an average particle size of about 0.1 to about 10 microns, and preferably about 0.5 to about 2 microns, and in yet other approaches about 0.5 to about 1 microns, efficiently adsorbed gold chloride from the above noted unconventional sources at factors greater than about 60%. Without wishing to be bound by theory, the increased surface area in colloidal carbon may aid in the increased the gold adsorption.

In one exemplary process as generally shown in FIG. 2, the colloidal carbon may be provided in about 5 to about 25 weight % solution and using about 5 to about 60 minutes (and preferably about 5 to about 30 minute) retention time in a tank or other holding vessel, such as a pond, to adsorb the gold chloride or sulfate to the colloidal carbon. Then, a ultrafiltration membrane may be used to remove the adsorbed colloidal carbon and recirculate it back to the feed source (such as, the tank or pond) and continue in this concentration mode until the UF filtrate increases in gold content (whereby the colloidal carbon is being loaded with the gold). Thereafter or simultaneously as shown in FIG. 2, and once sufficient gold is adsorbed on the colloidal carbon, the UF filtrate can then be sent to a post recovery process or a nanofiltration unit (FIG. 1 or 3) using either one or two stages to concentrate the gold (FIG. 3) and/or return it to the feed source for further recovery of gold in the NF concentrate. In some instances, a portion of the UF concentrate may optionally be sent to a filter press (or equivalent unit operation) as shown in FIG. 2 to dewater the colloidal carbon adsorbed with the gold. The filtrate from the filter press then can be sent to extraction, post processing, or a further nanofiltration process, again using either one or two stages of filtration, with the final concentrate being returned to the feed for further adsorption by colloidal carbon.

Figure 3:
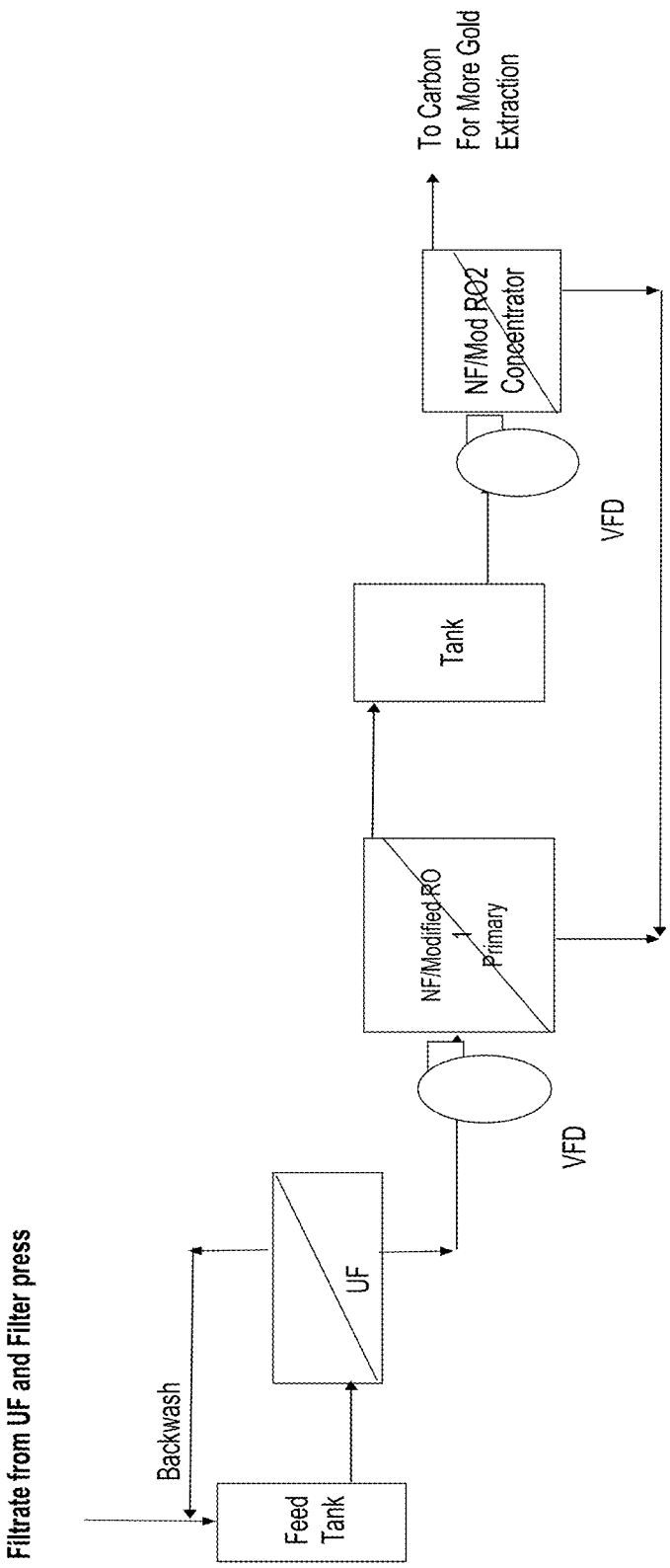
FIG. 3 is a flow diagram of an exemplary two-stage nanofiltration process for post carbon flow scheme for gold, silver, and/or REE recovery from unconventional feed water sources (e.g. high salinity source) and/or from permeate streams via the colloidal carbon adsorption of FIG. 2.

FIGS. 1 to 3 provide further details of exemplary method of precious metal recovery from unconventional feed sources when the metals may be complexed or bound to chlorides, sulfates, and the like and/or may be rare earth elements. Each may using a combination of ultrafiltration, nanofiltration, and/or reverse osmosis membranes as described above or further describe below in the configurations as shown in the figures to recover the target precious metals from unconventional feed water sources. The methods of FIGS. 1 to 3 recover the gold as concentrate from one or two stage nanofiltration systems with or without colloidal carbon adsorption.

In any approach or embodiment herein, exemplary ultrafiltration membranes may have a pore size of about 0.01 microns to about 0.5 microns and may be operated at about 10 to about 100 psi. In any approach or embodiment herein, exemplary nanofiltration membranes (as modified herein or above) may have a pore size of about 0.0007 microns to about 0.0012 microns and may be operated at about 200 to about 2000 psi and/or have up to about 300 molecular weight cut off. In another approach or embodiment herein, exemplary reverse osmosis membranes may have a pore size of about 0.0005 microns to about 0.001 microns and may be operated at about 200 to about 2000 psi. Membrane sizes and operating pressures may be varied as needed for particular applications. As used herein, the membrane processing may substantially retain or permeate various streams and, preferably, nanofiltration membranes unexpectedly retain the precious metals found in the unconventional feed water sources. In this context, substantially means at least a majority or at least about 50 percent, in other approaches, at least about 70 percent, and in other approaches, at least about 90 percent retention or permeation as the case may be.

EXAMPLES

The following examples are illustrative of exemplary embodiments of the disclosure. In these examples, as well as elsewhere in this application, all ratios, parts, and percentages are by weight unless otherwise indicated. It is intended that these examples are being presented for the purpose of illustration only and are not intended to limit the scope of the invention disclosed herein.

Example 1

Brine water sources, such as from lithium mines, were found to include gold. Table 1 below provides exemplary water sources with an average of 2 to 4 samples from multiple sources analyzed using AAS.

TABLE 1

| Sample | Au, ppm | Li, ppm |
| --- | --- | --- |
| 1 | 6 | 496 |
| 2 | 10 | 495 |
| 3 | 8 | 485 |
| 4 | 9 | 856 |
| 5 | 12 | 1499 |

Example 2

An experiment was performed to recover gold form a high salinity brine using colloidal carbon, such as colloidal carbon with an average particle size of about 2 microns or less (U.S. Pat. No. 9,770,743). A high salinity brine having 10 ppm gold, such as gold chloride in a brine water source, can be contacted with a 1 to 12 percent colloidal carbon solution for up to about 2 hours retention time to adsorb the gold. In one experiment with about a 8.3% colloidal carbon solution and after 2 hours retention with a high salinity brine having about 10 ppm of gold, the solution was then subjected to a ultrafiltration membrane where the permeate has about 4.2 ppm gold and the concentrate had about 25.1 ppm gold after scorification (smelting at about 1053 C with lead and borax), which was about 5× concentration.

Example 3

Nanofiltration rejection rates in an exemplary HCL solution for various rare earth elements is provided in Table 2 below.

TABLE 2

| Ion | % Rejection | Ion | % Rejection |
| --- | --- | --- | --- |
| Sc | 97.8 | Nd | 95.6 |
| V | 98.2 | Sm | 95.7 |
| Cr | 96.8 | Eu | 95.8 |
| Ga | 97.1 | Gd | 95.6 |
| Ge | 91.8 | Tb | 95.9 |
| Y | 96.3 | Dy | 96 |
| Zr | 99.5 | Ho | 96 |
| Nb | 99.3 | Eu | 96 |
| La | 94.9 | Tm | 96.1 |
| Ce | 94.5 | Yb | 96.1 |
| Pr | 95.7 | Lu | 96.1 |
|  |  | Hf | 99.1 |

It is to be understood that while the materials and methods of this disclosure have been described in conjunction with the detailed description thereof and summary herein, the foregoing description is intended to illustrate and not limit the scope of the disclosure, which is defined by the scope of the appended claims. Other aspects, advantages, and modifications are within the scope of the claims.

What is claimed is:

1. A method of recovering precious metals from unconventional feed water sources, the method comprising:
   providing a feed water source including precious metals in the form of gold tetrachloride, gold sulfate, silver tetrachloride, silver sulfate, rare earth elements, or mixtures thereof;
   contacting the feed water source including the precious metals with a colloidal carbon for a time effective to adsorb the precious metals;
   concentrating the colloidal carbon and absorbed precious metals from the feed water source using one or more of ultrafiltration, nanofiltration, and/or reverse osmosis membranes; and
   wherein the concentrating includes an ultrafiltration membrane to generate a concentrate including the colloidal carbon and absorbed precious metals and wherein at least a portion of the ultrafiltration concentrate is processed through a filter to dewater the colloidal carbon adsorbed with the precious metals; and
   recovering the precious metals from the dewatered concentrate.

2. The method of claim 1, wherein the feed water source includes a salt lake brine, a coal-fired plant flue-gas scrubber blowdown water, a concentrated brine from desalination of seawater, a high salinity brine source, and/or combinations thereof.

3. The method of claim 1, wherein the colloidal carbon has an average particle size ranging from 0.1 to about 10 microns.

4. The method of claim 1, wherein about 5 to about 25 weight percent colloidal carbon is mixed the feed water source.

5. The method of claim 4, wherein the colloidal carbon is mixed with the feed water source including the precious metals for about 5 to about 60 minutes.

6. The method of claim 1, wherein the concentrating includes recirculating a portion of the concentrate back to the feed water source.

7. The method of claim 6, wherein the precious metal is recovered from the colloidal carbon and wherein filtrate from the ultrafiltration membrane is processed through one or more nanofiltration membranes to concentrate any precious metals therein.

* * * * *